March 28, 1961 R. S. DAHLBERG, JR 2,977,410

AUTOMATIC FREQUENCY CONTROL SYSTEM

Filed Feb. 7, 1955 3 Sheets-Sheet 1

INVENTOR.
ROBERT S. DAHLBERG, JR.
BY
Allen V. Hazeltine
ATTORNEY

March 28, 1961 R. S. DAHLBERG, JR 2,977,410

AUTOMATIC FREQUENCY CONTROL SYSTEM

Filed Feb. 7, 1955 3 Sheets-Sheet 2

INVENTOR.
ROBERT S. DAHLBERG, JR.
BY
[signature]
ATTORNEY

AUTOMATIC FREQUENCY CONTROL SYSTEM

Filed Feb. 7, 1955 3 Sheets-Sheet 3

INVENTOR.
ROBERT S. DAHLBERG, JR.
BY
Allen V. Hazeltine
ATTORNEY

United States Patent Office 2,977,410

Patented Mar. 28, 1961

2,977,410

AUTOMATIC FREQUENCY CONTROL SYSTEM

Robert S. Dahlberg, Jr., Paoli, Pa., assignor to Philco Corporation, Philadelphia, Pa., a corporation of Pennsylvania Filed Feb. 7, 1955, Ser. No. 486,655

7 Claims. (Cl. 178—7.2)

This invention relates generally to automatic frequency control devices and more specifically to automatic frequency control devices constructed to detect and correct variations of the carrier signal frequency of unipolar frequency modulated signals. A unipolar frequency modulated signal is defined as a frequency modulated carrier wave signal, all of the frequency deviations of which are in a given sense with respect to the nominal carrier frequency.

In the transmission of certain forms of intelligence, unipolar frequency modulated signals are employed. Thus in the relaying of television signals, it is common to form a unipolar frequency modulated signal by frequency modulating a carrier wave in response to the usual composite video signal in such manner that the tips of the synchronizing component of the video signal correspond to the unmodulated carrier frequency.

In order to maintain the frequencies of the signal inside the acceptance band of receiver and further to conform to Federal Communications Commission regulations that such a signal be maintained within an assigned band of frequencies, it is necessary to maintain the frequency of the carrier signal at a reasonably constant value. In the prior art this has been accomplished in the following manner. The carrier signal generating source is constructed to generate, in the absence of a correcting means, a carrier signal having a frequency that is somewhat higher than the desired frequency of the unmodulated carrier signal under actual operating conditions; the desired frequency of the unmodulated carrier signal under actual operating conditions hereinafter is referred to as the operating frequency. The modulated signal is sampled at intervals of time corresponding to the transmission of the horizontal synchronizing pulses. As stated above, the frequency of these portions of the modulated signal is the frequency of the unmodulated carrier signal which is higher than the operating frequency. The samples are obtained by supplying the modulated signal to a conventional type frequency discriminator which has a crossover frequency equal to the operating frequency. Since the frequency of the carrier signal, in the absence of any correcting means, is higher than the crossover frequency of the discriminator, an output signal consisting of the aforementioned samples will be produced by the frequency discriminator which is used to correct the frequency of the carrier signal to operating frequency by suitable means.

It can thus be seen that the carrier signal generating source and the frequency discriminator act as two opposing forces on the carrier signal frequency, the carrier signal generating source tending to cause the carrier signal frequency to increase above operating frequency and the frequency discriminator producing an output signal which tends to lower the carrier signal frequency to operating frequency. The effect of the discriminator predominates so that the carrier frequency is maintained close to the operating frequency.

With this system of controlling frequency, however, the frequency of the carrier signal would immediately rise above operating frequency in the event of failure of the system. A further disadvantage of this system lies in the fact that conventional prior art frequency discriminators use crystal diodes in such a manner that a change in the properties of the diodes due to age and/or wear will produce a shift in the crossover frequency.

An object of the invention is to provide an automatic frequency control circuit to control the carrier signal frequency of a unipolar frequency modulated signal.

Another object of the invention is to provide an automatic frequency control circuit which will control the carrier signal frequency of a unipolar frequency modulated signal in a transmission system comprising a transmitter adjusted to generate said carrier signal at the desired operating frequency so that, if the automatic frequency control circuit should fail, the carrier signal frequency will remain at the desired operating frequency in the absence of normal deviation.

A further object of the invention is to provide an automatic frequency control system in which the frequency response characteristic is not dependent upon the characteristics of diodes.

Another object of the invention is to improve automatic frequency control circuits generally.

In accordance with one embodiment of the invention, a resonant means such as a resonant cavity is arranged to have supplied thereto the output signal of a transmitter. The output signal of the transmitter is a unipolar signal consisting of a carrier signal which is frequency modulated by a composite video signal. The frequency of the portions of the modulated signal representing the tips of the horizontal synchronizing pulses is the unmodulated carrier frequency. All of the frequencies of the remaining portions of the modulated signal are on one side only of the carrier frequency. Assume these frequencies to be lower than the carrier frequency. The frequency of those portions of the modulated signal representing the front and back porches of the composite video signal will consequently be less than the frequency representative of the tips of the horizontal synchronizing pulses by an amount which will remain fairly constant within the range of normal deviation of the carrier signal frequency owing, for example, to drift or enviroment. The cavity is tuned so that when the carrier signal is at operating frequency the frequency representing the tips of the horizontal synchronizing pulses and the frequency representing the front and back porches (or blanking level) will straddle the resonant frequency of the tuned cavity frequency response curve. Since the frequency response curve of the tuned cavity is substantially symmetrical about its resonant frequency, the tuned cavity, under these conditions, will produce an output signal in which the amplitudes of the portions derived from the horizontal synchronizing pulses and the amplitudes of the portions derived from the front and back porches are substantially the same. Deviation of the frequency of the carrier signal will create a difference in amplitude between the portions of the tuned cavity output derived from the synchronizing pulses and the portions derived from the front and back porches of the video signal. Means are provided to form pulses from these differences in amplitudes, with the envelope of the portions of the cavity output derived from the front and back porches determining the base potential of the pulse. These pulses, which can be either positive or negative with respect to the base potential are indicative of the direction and degree of deviation of the carrier frequency from operating frequency and are employed to correct the carrier signal frequency to operating frequency.

In accordance with one feature of the invention, a gating means is provided to insure that only the abovementioned frequency deviation indicating pulses are fed back to correct carrier frequency deviations. Output signals from the tuned cavity other than those derived from the horizontal synchronizing pulses and the front and back porches would not be indicative of the carrier signal frequency and consequently would introduce error into the system if permitted to be fed back to the transmitter. Synchronizing pulse separator means are provided to separate the synchronizing pulses from the composite video signal and to utilize the resultant pulses to open the gating means at predetermined time intervals coinciding with the application of the said frequency deviation indicating pulses to the gating means, so that only the frequency deviation indicating pulses will cause an output signal from the gating means.

In accordance with another feature of the invention, the transmission system will not fail if the automatic frequency control circuit should fail since the transmitter will continue to generate a unipolar signal whose carrier signal is at operating frequency in the absence of deviation from usual causes such as environment.

Further, this invention does not utilize diodes in the manner that they are used in conventional type frequency discriminators where a change in the properties of the diodes can easily cause a shift in the crossover frequency.

These, and other objects and features of the invention, will be more fully understood from the following detailed description thereof when read in conjunction with the drawings in which.

Figures 1, 8, 11:
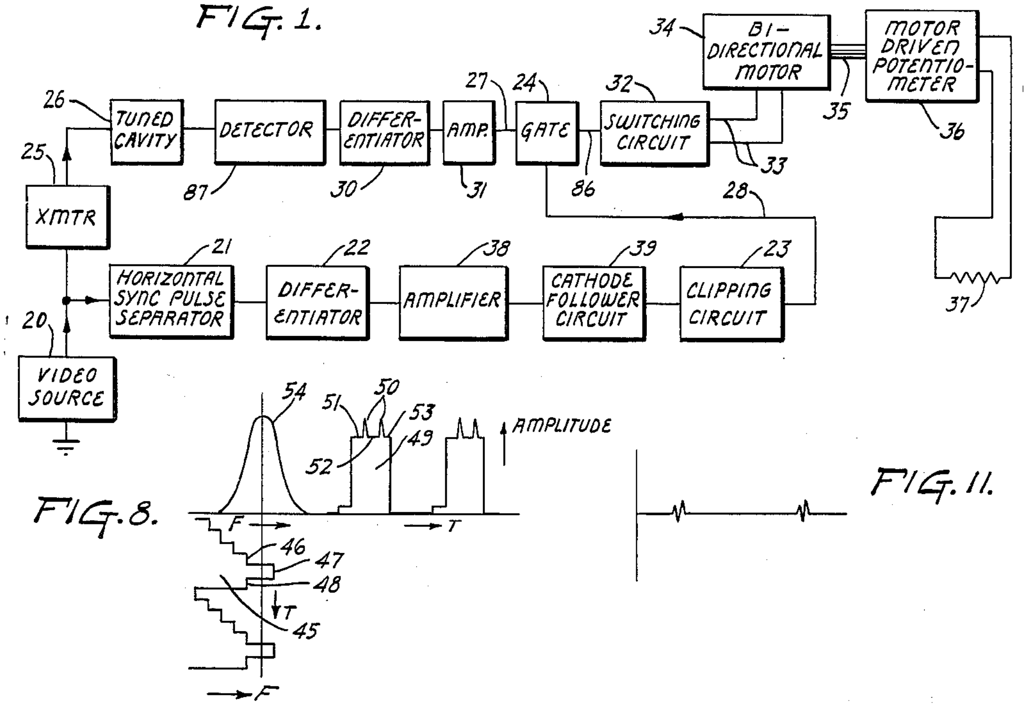
Fig. 1 is a block diagram of an embodiment of this invention.
Figure 9:
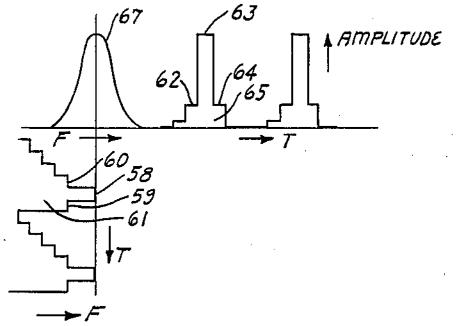
Figure 12:
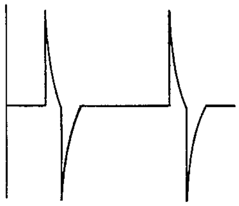
Figure 10:
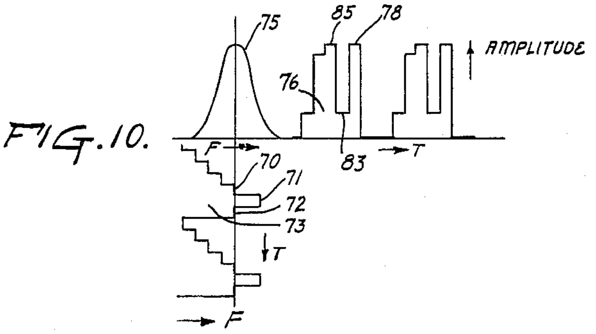
Figure 13:
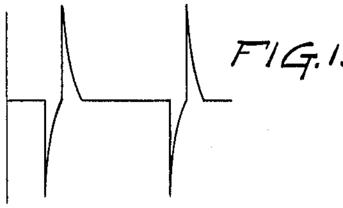

Figs. 8, 9 and 10 show waveforms of the input and the detected output voltages of the tuned cavity for the conditions in which the frequency corresponding to the tips of the synchronizing pulses is, at operating frequency, below operating frequency, and above operating frequency, respectively; and Figs. 11, 12 and 13 show the voltage waveforms obtained as a result of differentiating the detected tuned cavity output pulses shown in Figs. 8, 9 and 10 respectively.

Referring now to Fig. 1, the video source 20 represents structure designed to generate a typical composite video signal including the horizontal synchronizing pulses and the front and back porches which immediately precede and follow each of the synchronizing pulses. The horizontal synchronizing pulse separator 21 is constructed to separate the horizontal synchronizing pulses from the video signal. Block 22 represents a differentiating circuit which functions to differentiate the output of the synchronizing pulse separator circuit 21. The differentiation produces from each input pulse a sharply defined output waveform having positive and negative portions derived respectively from the leading and trailing edges of each input pulse and having a desired reference potential. The output of the differentiating circuit is amplified by amplifier 38, the output of which is supplied to the cathode follower circuit 39. The cathode follower circuit is provided to present a low impedance source to a pulse transformer which forms a part of the gating means 24. This will be described later. Clipping circuit 23 clips off either the negative or the positive portions of the output pulses from the cathode follower circuit to produce a series of unidirectional pulses which are applied to the gating means 24 via input conductor 28. The gating circuit 24 has another input conductor 27 in addition to input conductor 28. Both of these input conductors must be energized simultaneously to cause an output signal to be produced on the gating circuit output terminal 86. The series of unidirectional pulses applied to the gating circuit 24 on conductor 28 functions to open the gating means 24 simultaneously with the application to input conductor 27 of pulses which indicate deviation of the carrier signal. Resultant output signals are formed at the output terminal 86 of the gating means 24 having polarities in accordance with the polarities of the pulses applied to the input conductor 27.

The circuitry by which the pulses indicating carrier frequency deviation are derived will now be considered. The transmitter 25, which may comprise a klystron, is constructed to generate a carrier signal which is frequency modulated by the composite video signal to form a unipolar frequency modulated signal with the portions corresponding to the tips of the horizontal synchronizing pulses at carrier frequency. The output of the transmitter is supplied to the input of tuned cavity 26 which is tuned to a frequency midway between the frequencies of the portions of the modulated signal produced by the tips of the horizontal synchronizing pulses and those produced by the front and back porches when the carrier signal is at operating frequency. Thus at operating frequency the amplitude of the tuned cavity output signal produced by the horizontal synchronizing pulse tips and the amplitude of the tuned cavity output signal produced by the front and back porches are equal. If, however, the carrier frequency deviates from operating frequency, the abovementioned amplitudes will become unequal and, when detected by the detector means 87, will result in a series of pulses whose amplitudes and polarities indicate the degree and direction of deviation of the carrier signal frequency. It is to be understood that other types of resonating means may be employed in lieu of the tuned cavity 26. For example, a parallel or a series arrangement of a capacitor and an inductor may be used.

The block 30 represents a differentiating circuit constructed and arranged to differentiate the detected output of the tuned cavity circuit to produce, for each detected output pulse of the tuned cavity, a resultant waveform consisting of a pulse derived from the leading edge of the detected output pulse and a pulse derived from the trailing edge of the detected output pulse. Each of these pulses can be either positive or negative depending on the polarity of the pulse which was differentiated. Only the pulses derived from the trailing edge are used in this embodiment as will be seen later. However, if desired, the pulses derived from the leading edges could be used in lieu of those derived from the trailing edges. Amplifier 31 performs the function of amplifying the output of the differentiating circuit 30. The pulses appearing at the output of the amplifier 31 are impressed upon the input conductor 27 of the gating circuit and, together with a coincident pulse applied upon conductor 28, will cause the gating circuit to produce output pulses of either positive or negative polarity depending on the polarity of the pulses applied to the input conductor 27. Switching circuit 32 is constructed to respond to the output pulses of the gating circuit 24 to supply signals to the bi-directional motor 34 which will cause the motor to rotate in one of its two possible directions in accordance with the polarity of the signal applied to the switching circuit 32. Potentiometer 36, which is driven by the motor 34, is constructed so that its voltage output will vary in magnitude in accordance with the degree and direction of rotation of the motor 34. Consequently the current flow in the resistive heater element 37 will also vary in accordance with the direction and amount of rotation of the shaft 35. The heat generated in the resistive element 37 is utilized to thermally tune the klystron (not shown) of the transmitter so that the frequency of the carrier signal will remain at operating frequency. This can be accomplished in a conventional manner by utilizing the heater element 37 to heat a rod (not shown) having a suitable thermal coefficient of expansion. This rod is physically connected to one of the grids of the klystron and is arranged to cause a change in the spacing between the grid electrodes of the klystron as the heating element 37 causes the length of the rod to increase or decrease. The operation of the embodiment described is such that, for any given deviation of carrier frequency from operating frequency, the spacing between the electrodes of the klystron is changed in the proper amount to correct the frequency of the carrier signal to operating frequency.

Figures 3, 4, 5, 6, 7:
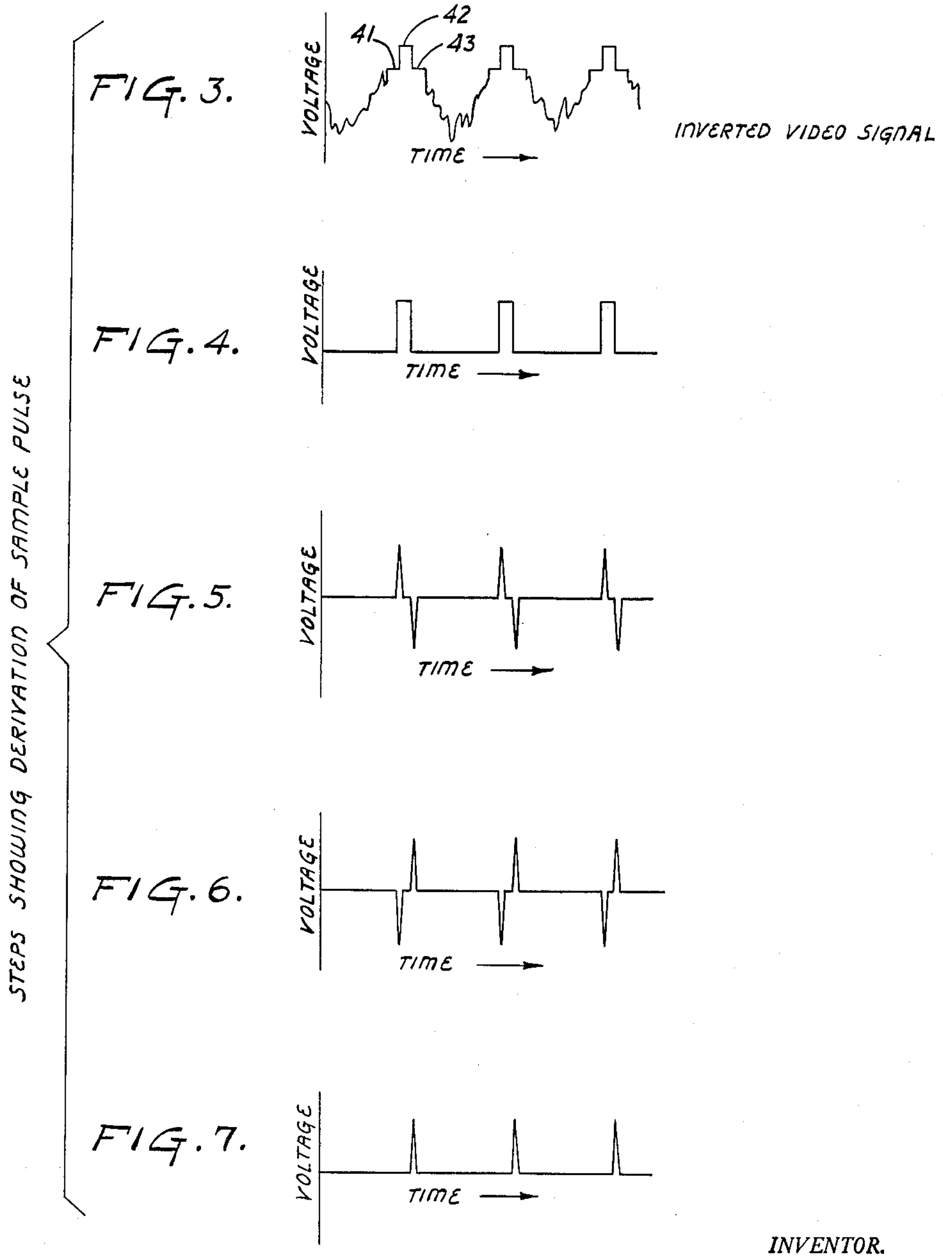
Figs. 3, 4, 5, 6 and 7 show the waveforms of the signals at various points in the circuit of Fig. 2 relating to the separation of the horizontal synchronizing pulses from the composite video signal.

The operation of the circuit of Fig. 1 will now be described in detail. The video signal source 20 generates a video signal which is represented by the waveform shown in Fig. 3. This signal is supplied to the transmitter 25 to modulate the carrier signal generated therein and it is also supplied to the sylchronizing pulse separator 21. The modulated output signal from the transmitter 25 is supplied to the tuned cavity 26 which is part of a circuit utilized to derive a signal indicative of the deviation of the carrier signal frequency from operating frequency. The horizontal synchronizing pulse separator 21 is part of a circuit constructed to derive a signal which will open the gating circuit 24 at the proper times to permit only the signals indicating carrier frequency deviation to be employed in the correcting of such deviation. The circuit employing the synchronizing pulse separator will be considered first. Referring to Fig. 3 the portion 41 of the waveform shown therein represents the front porch, the portion 42 represents the horizontal synchronizing pulse, and the portion 43 represents the back porch of the composite video signal. This composite video signal is supplied from source 20 to the synchronizing pulse separator circuit 21 of Fig. 1 which is constructed to separate the horizontal synchronizing pulses of the video signal from the remainder of the video signal to produce an output as represented by the waveform of Fig. 4. The signal of Fig. 4 is then differentiated by differentiating circuit 22 which produces a waveform as shown in Fig. 5. Each of the pulses of Fig. 4, when differentiated, produces a positive pulse and a negative pulse. To open the gating circuit 24 it is necessary to apply thereto only pulses of a given polarity which in this embodiment of the invention has been selected as being positive. Consequently the negative portions of the waveform of Fig. 5 can be eliminated. This is accomplished by amplifying the output of the differentiating circuit 22 to produce output pulses as shown in Fig. 6 which are then supplied to the clipping circuit 23. The clipping circuit 23 clips off the negative pulses to produce the resultant pulses represented by the waveforms shown in Fig. 7. Each of these pulses opens the gating circuit 24 when applied thereto so that, when a coincident pulse of either negative or positive polarity derived from the output of the tuned cavity 26 is applied to the input conductor 27 of the gating circuit 24, there will be produced at the output terminal 86 of the gating circuit 24 a signal whose polarity depends on the polarity of the input signal derived from the tuned cavity output. It is to be noted that the time scales of Figs. 3, 4, 5, 6 and 7 are the same.

The derivation of the above-mentioned coincident pulse will now be described.

The composite video signal supplied to the transmitter 25 is caused to frequency modulate the carrier signal generated therein to produce a resultant waveform represented graphically by curve 45 of Fig. 8 in which the carrier frequency is assumed to be operating frequency. The ordinate of the curve 45 of Fig. 8 represents time (T) and the abscissa represents frequency (F). The portion 46 of the waveform 45 represents the front porch which immediately precedes the synchronizing pulse represented by the portion 47. The back porch represented by portion 48 follows the synchronizing pulse portion 47 in time. The signal represented by the curve 45 is supplied to the tuned cavity 26 having a frequency response curve 54 in which the abscissa represents frequency and the ordinate represents amplitude. Pulse waveform 49, which has amplitude as its ordinate and time as its abscissa, represents the detected output of the tuned cavity 26 when the pulse waveform 45 is supplied thereto. The portion 51 of the waveform 49 corresponds to the front porch portion 46 of the curve 45, the portion 52 corresponds to the synchronizing pulse portion 47 of the curve 45, and the portion 53 corresponds to the back porch portion 48 of the curve 45. It can be seen from Fig. 8 that the potential levels of the portions 51, 52 and 53 of waveform 49 are the same. This is because of the fact that the frequency of the portion 47 of waveform 45 and the frequency of the portions 46 and 48 of waveform 45 straddle the resonant frequency of the tuned cavity frequency response curve 54 when the carrier signal is at operating frequency. The two voltage pips 50 are produced as a result of the leading and trailing edges of the synchronizing pulse portion 47 of the curve 45. However, these pips have a low energy level and do not prove troublesome in the circuit. Thus, it can be seen that if the carrier frequency (which is the frequency of portion 47) is at operating frequency, there is no difference in potential in the portions of the output of the cavity resonator corresponding to the front and back porch portions 46 and 48 and the tip portion 47 of the horizontal synchronizing pulse of the curve 45.

Fig. 9 illustrates the case in which the frequency of the portion of the modulated signal corresponding to the synchronizing pulse tip has deviated below operating frequency. It is to be noted that the ordinates and abscissas for the various waveforms of Fig. 9 represent the same quantities as do the ordinates and abscissas of the corresponding waveforms of Fig. 8. The frequency of the tip of the synchronizing pulse portion 58 has deviated to a point at which it is equal to the resonant frequency of the tuned cavity. The frequency of the front and back portions 60 and 59 is substantially below the resonant frequency of the tuned cavity. Consequently, the potential of the detected portion 63 of the tuned cavity output waveform 65 which corresponds to the synchronizing pulse portion 58 of the curve 61 will be substantially larger than the potential of the detected portions 62 and 64 of the tuned cavity output waveform 65 which correspond to the front and back porches 60 and 59 of the waveform 61. As can be seen from Fig. 9, the portion 63 forms a positive pulse with respect to the portions 62 and 64 of the waveform 65 and has relatively steep leading and trailing edges.

Fig. 10 illustrates the case where the frequency of the portion 71 of the curve 73 representing the tip of the horizontal synchronizing pulse has deviated above operating frequency to a degree such that the frequency of the portions 70 and 72 of the curve 73 which represent the front and back porches of the composite video signal is the same as the resonant frequency of the tuned cavity. Under these circumstances the application of the signal represented by the curve 73 to the tuned cavity will produce an output signal from the tuned cavity which, when detected, is represented by the waveform 76 wherein the portion 83 corresponds to the portion 71 of waveform 73, and wherein portions 85 and 78 correspond to the portions 70 and 72 of the waveform 73. It can be seen that the portion 83 of waveform 76 constitutes a negative pulse with respect to the portions 85 and 78.

Thus, when the carrier wave frequency is at operating frequency, the tuned cavity will produce an output signal, in which, after detection, there will be no difference in amplitude between those portions corresponding to the horizontal synchronizing pulses and those portions corresponding to the front and back porches of the composite video signal. However, when the frequency of the carrier wave is below operating frequency, positive pulses will be created at times corresponding to the occurrence of the horizontal synchronizing pulses and when frequency of the carrier wave is above operating frequency, negative pulses will be created at times corresponding to the horizontal synchronizing pulses.

The detected output of the tuned cavity 26 of Fig. 1 is next differentiated by means of the differentiating circuit 30. The differentiated waveforms are shown in Figs. 11, 12, and 13, and represent the differentiated waveforms of the tuned cavity outputs which are shown after detection in Figs. 8, 9 and 10 respectively. The output of the differentiating circuit is fed into the video amplifier 31 and the output from the video amplifier 31 is supplied to the gating network 24.

As discussed hereinbefore, the gating circuit 24 requires simultaneous application of pulses upon the conductors 27 and 28 in order to produce a signal at the output terminal 86. The pulses formed by differentiating the trailing edges of the frequency deviation indicating pulses derived from the tuned cavity 26 are applied to the gating circuit 24 through conductor 27 at times coinciding with the application to gating 24 via conductor 28 of pulses formed by differentiating the trailing edges of the pulses derived from the synchronizing pulse separator circuit 21. Thus, the gating circuit functions to produce a pulse only at times when the signal derived from the tuned cavity 26 is representative of the deviation of the carrier signal frequency from operating frequency. Output signals of the tuned cavity, derived from the intelligence bearing portions of the modulated signal, will not cause an output signal from the gating means 24 since there will be no coincident signal on conductor 28.

The output pulse of the gating circuit 24, which may be either positive or negative in polarity in accordance with the polarity of the pulse derived from the tuned cavity 26, is supplied to the switching circuit 32. If a positive pulse is supplied to the switching circuit 32, the switching circuit will function to cause the bi-directional motor 34 to rotate in a first direction. A negative pulse supplied to the switching circuit 32 will produce an output signal which will cause the bi-directional motor 34 to rotate in the opposite direction. The rotation of the bi-directional motor 34 will mechanically adjust the potentiometer 36 so that the amplitude of the current in the resistive element 37 will vary in accordance with the degree and direction of rotation of the shaft 35. The resistive element 37 represents a heating element which can be utilized to thermally tune the klystron in the transmitter 25 as stated hereinbefore.

Figure 2:
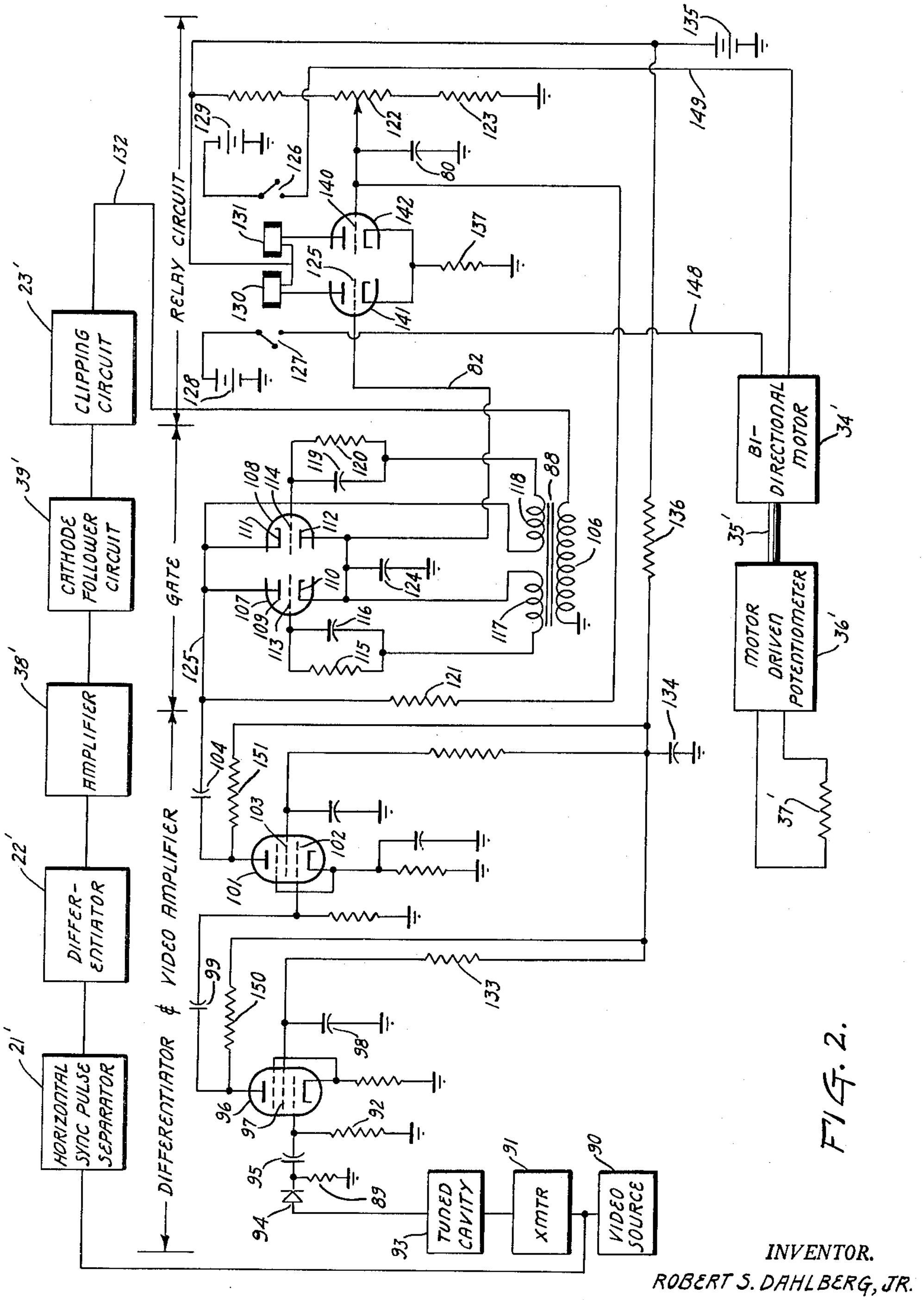
Fig. 2 is a combination schematic and block diagram of an embodiment of this invention.

Referring now to Fig. 2 there is shown a circuit similar to that of Fig. 1 except that in Fig. 2 the portion of the circuit employed to derive a pulse indicative of deviation of the carrier signal frequency from operating frequency by means of the tuned cavity 93 is shown in schematic diagram form. The blocks 21′, 22′, 38′, 39′, and 23′, in Fig. 2 perform the same function and cooperate in the same manner as do the blocks in Fig. 1 having the same reference characters (unprimed). Reference is made to Fig. 1 for a description of the operation of these blocks which is to separate the horizontal synchronizing pulses from the composite video signal and to prepare such pulses for application to the gating circuit. Each of the blocks 21′, 22′, 38′, 39′, and 23′, represent well known circuits and consequently are not shown in schematic form. Further the blocks 36′ and 34′, the motor shaft 35′, and the heater element 37′ of Fig. 2 perform the same function and cooperate in the same manner as do the elements of Fig. 1 having the same reference characters (unprimed).

The output of the clipping circuit represented by block 23′ is supplied through lead 132 to the primary winding 106 of a pulse transformer 88 which also includes secondary windings 117 and 118 and which forms a portion of the gating circuit. The output lead 132 of Fig. 2 corresponds to the lead 28 of Fig. 1.

As stated hereinbefore the gating circuit requires the simultaneous application of pulses upon its two input means in order to produce an output pulse. In Fig. 2 one of these input means is conductor 132 and the other is conductor 125. The pulses, which may be either negative or positive, which are impressed upon the conductor 125 are derived from the modulated signal output of the transmitter 91 through circuitry which will now be discussed.

The transmitter 91 is constructed to generate an output signal which consists of a carrier signal frequency modulated in accordance with the composite video signal from the video source 90. The modulated output signal of transmitter 91 is supplied to the input of the tuned cavity resonator 93 by an appropriate means such as a waveguide (not shown). Tuned cavity resonator 93 is tuned to a frequency which is substantially midway between the frequency of the portions of the modulated signal representing the front or back porches and the frequency of the portions of the modulated signal representing the tips of the horizontal synchronizing pulses when the carrier signal frequency is at operating frequency. The reasons for this already have been explained in the discussion of the circuit of Fig. 1. Also, as discussed hereinbefore with respect to Fig. 1, the detected output of the cavity resonator 93, when the carrier signal deviates from operating frequency, is in the form of either a positive or a negative pulse which is defined by the response of the tuned cavity to the frequency of the portions of the modulated signal representing the tips of the synchronizing pulses and to the frequency of the portions of the modulated signal representing the front and back porches of the video signal. The output from the tuned cavity is detected by means of diode 94 and load resistor 89 in a well known manner. Capacitor 95 and the resistor 92 form a differentiating circuit for the detected output of the tuned cavity 93. The function of this differentiating circuit is to provide a pulse having a suitable reference potential. It is to be noted that the differentiating circuit will produce pulses of opposite polarities from the leading and trailing edges of each of the detected pulses from the tuned cavity. The time of occurrence of these pulses will coincide with the time of occurrence of the differentiated output pulses of the synchronizing pulse separator circuit described hereinbefore.

The pentodes 96 and 101, and the circuitry associated therewith, form two stages of video amplification of the output signal from the differentiating circuit. Screen grids 97 and 103, of the pentodes 96 and 101 respectively, each are connected to ground potential through a capacitor. For example, the screen grid 97 of pentode 96 is connected to ground potential through capacitor 98. The function of these capacitors is to by-pass the A.-C. components of screen grid current to ground potential to maintain the potential of the screen grid reasonably constant, thus improving the gain of the pentode. The screen grid 97 is further connected to positive battery supply 135 through the resistors 133 and 136. Capacitor 134 functions to shunt alternating currents to ground, thus aiding in maintaining a constant screen grid potential. The output of the tube 96 is supplied to tube 101 through coupling capacitor 99. Resistors 150 and 151 are plate load resistors.

The output pulse from the tube 101 is supplied through the coupling capacitor 104 to the gating circuit which comprises triodes 107 and 108, the circuitry associated therewith, and the pulse transformer 88.

The triodes 107 and 108 are connected in parallel with each other in such a manner that the plate 109 and the cathode 110 of triode 107 are connected respectively to the cathode 111 and the plate 112 of the triode 108. Each of the grids 113 and 114, of the triodes 107 and 108, are connected to their respective cathodes by means of a grid leak circuit and a secondary winding of the pulse transformer which, when energized, will produce a biasing potential in the grid leak circuit. More specifically, grid 113 of the tube 107 is connected to the cathode 110 through a circuit consisting of the parallel combination of resistor 115 and the capacitor 116 connected in series with the secondary winding 117 of the pulse transformer. The secondary winding 117 is wound so that, as pulses are induced therein by virtue of the primary winding 106 being energized, a potential is developed across the capacitor 116 having a polarity such as to cause the control grid 113 to become negative with respect to the potential of the cathode 110. This occurs in the following manner. Since the capacitor 116 initially has no potential thereacross, the control grid will then be about at cathode potential. The first pulse induced in winding 117 will cause the potential of the control grid 113 to rise above the cathode potential, thus producing a grid current from grid 113 to cathode 110. At the cessation of the pulse a negative charge will be left on the capacitor 116 which will only partially discharge during the time interval before the arrival of the next pulse to the primary winding 106. After several such pulses the potential across the capacitor 116 will reach a value where the amount of discharging between pulses will equal the amount of charging during pulses. Under these conditions the potential of the grid 113 will be below cutoff during the time interval between pulses and will be about equal to the potential of the cathode 110 during the pulses induced in the secondary winding 117. However, even during the pulses induced in the secondary winding 117, the tube 107 will not conduct since both the cathode 110 and the anode 109 are at the same potential in the absence of the application upon conductor 125 of a pulse derived from the tuned cavity 93. By means of a similar circuit arrangement the potential of the control grid 114 of triode 108 will be maintained below cutoff during the time interval between pulses applied to the primary winding 106 of the pulse transformer and will be substantially at cathode potential during such pulses. This similar circuit arrangement is connected between the grid 114 and the cathode 111 of tube 108, and consists of the secondary winding 118 of the pulse transformer connected in series with the parallel arrangement of capacitor 119 and resistor 120.

The anodes 109 and 112, and the cathodes 110 and 111, in the absence of any applied pulses other than those induced in the secondary transformer windings 117 and 118, will be at substantially the same potential. More specifically, the anode 109 and the cathode 111 are both connected directly to the common terminal 125 which is connected to a reference potential through a path comprising resistor 121, resistor 122, and resistor 123. Since there is no circuit through which the capacitor 124 can be charged as a direct result of the energization of the secondary windings 117 and 118, the plate 112 and the cathode 110 of tubes 108 and 107 also will be at substantially reference potential in the absence of a pulse applied to the conductor 125. The capacitor 124 will acquire a charge only when one or the other of the triodes 107 or 108 is conducting owing to the fact that the tubes 107 and 108 comprise the only charging circuits therefor.

The gating circuit is constructed so that such conduction will occur only when a positive or a negative pulse is applied to the plate 109 and the cathode 111 through conductor 125 simultaneously with the application of a pulse to the primary winding 106 of the pulse transformer. For example, if a positive pulse derived from the tuned cavity and indicative of carrier frequency deviation is impressed upon the conductor 125 at the same time that the primary winding 106 of the pulse transformer is energized, the triode 107 will become conductive for the following reasons. The potential of the grid 113 will become substantially equal to the potential of the cathode 110 due to the energization of the primary winding 106 and the potential of the plate 109 will become positive with respect to the potential of the control grid 113 and the cathode 110. The tube 108 will not become conductive, however, since the cathode 111 will become positive with respect to the anode 112 thereof. The current flow through the conducting tube 107 will cause a positive potential to exist across the capacitor 124 which will be indicative of the sense and magnitude of the deviation of the carrier signal frequency. If a negative pulse is applied to the plate 109 and the cathode 111 through the conductor 125 simultaneously with the application of a pulse upon the primary winding 106 of the pulse transformer, the triode 108 will become conductive for the following reasons. The potentials of the grid 114 and the cathode 111 will be substantially equal at this time and will be lower than the potential of the plate 112 due to the application of the negative pulse upon the cathode 111. The tube 107, under these circumstances, will not become conductive since the plate 109 is at a lower potential than the potential of the grid 113 and the cathode 110. Current flow through the triode 108 will create a drop in the potential across the capacitor 124 which is indicative of the sense and magnitude of the deviation of the carrier signal frequency. The potential across the capacitor 124 constitutes the gating circuit output signal which is supplied to the relay circuit.

In the relay circuit triodes 141 and 142 have their cathodes connected to ground through the common resistor 137. The control grid 140 of the tube 142 is connected to the conductor 125 through resistor 121 and remains substantially at reference potential. A pulse applied to the conductor 125 will not appreciably affect the potential of control grid 140, however owing to the shunting effect of capacitor 80. The control grid 125 of triode 141 is connected to the capacitor 124 and, in the absence of an error voltage across said capacitor 124, is at reference potential. Under these conditions the current flow through the triodes 141 and 142 is about the same. However, if a positive potential, for example, exists across the capacitor 124 the grid 125 of tube 141 will also be at a positive potential and the plate current through the tube 141 will increase while the plate current through tube 142 will decrease due to the common cathode resistor 137. If the potential across the capacitor 124 decreases from reference value the plate current of tube 141 will decrease and the plate current of tube 142 will increase.

Relays 130 and 131 are constructed so that, when the control grids 125 and 140 are at reference potential, the plate currents of the triodes 141 and 142 are insufficient to operate the relays 130 and 131. If, however, for example, the grid 125 of triode 141 is at a positive potential, the plate current of triode 141 will be increased so that the relay 130 will be operated to close contacts 127 and connect positive battery source 128 to the bi-directional motor 34' through conductor 148. This will cause the bi-directional motor to rotate in one of its two directions. If the potential of the grid 125 is caused to be negative, the plate current of triode 142 will be increased so that the relay 131 will be operated to close contacts 126, thus connecting the negative battery source 129 to the bi-directional motor 34' through conductor 149. This will cause the bi-directional motor to rotate in its other direction.

It is to be noted that, since the triodes 141 and 142 are arranged so that as the plate current in one increases the plate current in the other decreases, only one of the relays 130 or 131 will be operated at any given time.

The operation of the circuit of Fig. 2 will now be described. The operation of the blocks 21', 22', 38', 39' and 23', which function to derive a series of pulses from the horizontal synchronizing pulses of the composite video signal, has been described hereinbefore with respect to Fig. 1 and reference is made to that description.

The output of the clipping circuit 23', which consists of a series of positive pulses as shown in Fig. 7, is supplied through the input conductor 132 to the primary winding 106 of the pulse transformer 88 which forms a part of the gating circuit. The secondary windings 117 and 118 of the pulse transformer are inductively energized to prepare the triodes 107 or 108 of the gating circuit to conduct. In order to cause one or the other of tubes 107 or 108 to conduct, it is necessary that either a positive pulse or a negative pulse be supplied to conductor 125 simultaneously with the energization of the secondary windings 117 and 118 of the pulse transformer.

In order to trace the origin and development of the pulses to be applied to the conductor 125, reference is made to the composite video signal source 90 which is arranged to supply a composite video signal to the transmitter 91 to frequency modulate the carrier signal generated in the transmitter 91. The tuned cavity resonator 93 is tuned to a frequency midway between the frequency of the portions of the modulated signal representing the tips of the synchronizing pulses and the frequency of the portions of the modulated signal representing the front and back porches when the carrier signal is at operating frequency. These conditions are shown in Fig. 8 which is described hereinbefore with respect to Fig. 1. Figs. 9 and 10 represent the conditions where the carrier frequency is below and above operating frequency also as described hereinbefore.

Assume that the carrier signal frequency, and hence the frequency of those portions of the modulated signal representing the tips of the synchronizing pulses, is below operating frequency as represented by the waveforms of Fig. 9. When the signal, represented by the curve 61 of Fig. 9, is supplied to the tuned cavity 93, the detected output of the tuned cavity is a positive pulse as represented by the pulse 63 of Fig. 9. Detection of the output of the tuned cavity 93 of Fig. 2 is accomplished by means of the diode 94 and the load resistor 89 in the circuit. This positive pulse is differentiated by the differentiating circuit, comprising capacitor 95 and the resistor 92, to produce an output as represented by the waveform shown in Fig. 12. This waveform is composed of a positive portion and a negative portion which are derived respectively from the leading edge and the trailing edge of pulses such as the positive pulse 63 of Fig. 9. The output of the differentiating circuit is amplified through two stages of amplification comprising the pentodes 96 and 101 of Fig. 2, and is then supplied through coupling capacitor 104 to the gating circuit via conductor 125.

It is to be noted that it is possible to use the differentiated output of either the leading edge or the trailing edge of the detected output of the tuned cavity to indicate frequency deviation. The only difference will be that the polarity of the signal from the gating circuit will be reversed. In the embodiment shown in Fig. 2, the trailing edge is used. Thus, only the negative portion is utilized. It will be observed that the differentiated trailing edges of the pulses from the tuned cavity circuit coincide in time with the differentiated trailing edges of the pulses from the synchronizing pulse separator circuit since they are both derived from the trailing edges of the horizontal synchronizing pulses. Consequently, they will be applied to the gating network substantially simultaneously. When the negative pulse derived from the tuned cavity 93 is supplied through the conductor 125 to the cathode 111 of tube 108 of the gating circuit, the tube 108 becomes conductive, thus causing a negative potential to exist across the capacitor 124. Since the capacitor 124 is connected directly to the grid 125 of triode 141 of the relay circuit, the plate current of the triode 141 will be decreased, thus increasing the plate current of the triode 142 owing to the presence of the common cathode resistor 137. The increased plate current in the triode 142 will operate the relay 131 to close the contacts 126. Closure of contacts 126 will connect the negative battery source 129 to a bi-directional motor 34′. The bi-directional motor 34′ is responsive to the negative battery source 129 to rotate in a first direction.

If a positive pulse derived from the tuned cavity 93 is applied to the anode 109 and the cathode 111 of triodes 107 and 108 respectively, the triode 107 will become conductive and a positive potential rise will be caused to occur across capacitor 124. This positive potential will be applied to the control grid 125 of triode 141. The plate current of the triode 141 will increase to operate the relay 130, thus closing the associated contacts 127 and connecting the positive battery source 128 to the bi-directional motor 34′. This will cause the bi-directional motor to rotate in a second direction. The potentiometer 36′ and the heater element 37′ are responsive to the rotation of the bi-directional motor to correct the frequency of the carrier signal to operating frequency as described hereinbefore in connection with Fig. 1.

It is to be understood that the forms of the invention herein shown and described are but preferred embodiments of the same, and that various changes may be made in circuit arrangements, values of circuit constants, and circuit elements used therein without departing from the spirit or scope of the invention.

I claim:

1. In a transmission system comprising means for generating a unipolar frequency modulated signal in which first portions thereof are at carrier signal frequency and other portions thereof immediately adjacent said first portions are at a frequency which is different from said carrier signal frequency by a susbtantially constant amount, an automatic frequency control system for maintaining the frequency of the carrier signal of the modulated signal at a predetermined value, said automatic frequency control system comprising a single resonating means tuned to a given frequency which is substantially midway between the carrier frequency of said unipolar signal when the frequency of the carrier signal is at said predetermined value and the frequency of said other portions of the unipolar signal, means for supplying said unipolar signal to said resonating means, and means connected to said resonating means and responsive to the portions of the output signal of said resonating means derived from said first portions and said other portions of said unipolar signal to produce an output signal indicative of deviation of said carrier signal frequency from said predetermined value.

2. In an electrical system comprising means constructed to generate a carrier signal which is frequency modulated by a composite video signal having horizontal synchronizing pulses and a blanking level to produce a unipolar signal in which the frequency of the portions representing the tips of the horizontal synchronizing pulses is the frequency of the carrier signal, an automatic frequency control circuit constructed to maintain the frequency of the carrier signal at a given frequency, said automatic frequency control circuit comprising a single resonating means tuned to a frequency which is susbtantially midway betwen the frequency of the portions of the modulated signal representative of the tips of the horizontal synchronizing pulses of the composite video signal and the frequency of the portions of the modulated signal representative of the blanking level of the composite video signal when the frequency of the carrier signal is at said given frequency, means for detecting the output of said resonating means, and means connected to said detecting means and responsive to the difference in potential between the detected portions of the output signal of the resonating means corresponding to the tips of the horizontal synchronizing pulses and the detected portions of the output signal of the resonating means corresponding to the blanking level to modify the carrier signal frequency towards said given frequency.

3. In an electrical system comprising means constructed to generate a carrier signal which is frequency modulated by a composite video signal having horizontal synchronizing pulses and a blanking level to produce a unipolar signal in which the frequency of the portions representing the tips of the horizontal synchronizing pulses is the frequency of the carrier signal, an automatic frequency control circuit constructed to maintain the frequency of the carrier signal at a given operating frequency, said automatic frequency control circuit comprising a single cavity resonator tuned to a frequency which is substantially midway between the frequency of the modulated signal representative of the tips of the horizontal synchronizing pulses of the composite video signal and the frequency of the modulated signal representative of the blanking level of the composite video signal when the frequency of the carrier signal is at said given operating frequency, means for detecting the output of the said cavity resonator, and means connected to said detecting means and responsive to the difference in potential between the detected portions of the cavity resonator output signal corresponding to the tips of the horizontal synchronizing pulses and the detected portions of the cavity resonator output signal corresponding to the blanking level to modify the frequency of said carrier signal towards said given operating frequency.

4. In a transmitting system comprising means for generating a carrier signal which is frequency modulated by a composite video signal having horizontal synchronizing pulses and front and back porches to produce a unipolar signal in which the frequency of the portions thereof representing the tips of the horizontal synchronizing pulses is the frequency of the carrier signal, a single cavity resonator tuned to a given frequency which is substantially midway between those portions of the unipolar signal representing the tips of the horizontal synchronizing pulses when the carrier signal frequency is at the desired carrier signal operating frequency and the frequency of those portions of the frequency modulated signal representing the front and back porches of the composite video signal, means for supplying the unipolar signal to said cavity resonator, circuit means connected to said resonator comprising a gating means constructed to produce an output signal only in response to the application to said gating means of a second signal derived from the difference between the potential developed in the cavity resonator output in response to the portions of the modulated signal representing the tips of the horizontal synchronizing pulses and the potential developed in the cavity resonator output in response to the portions of the modulated signal representing the front and back porches of the composite video signal, means for deriving said second signal, and means connected to said gating means and responsive to the output of said gating means to modify the deviation of frequency of said carrier signal towards the desired carrier signal operating frequency.

5. In a transmission system, means for generating a carrier signal which is frequency modulated by a composite video signal having horizontal synchronizing pulses and front and back porches to produce a unipolar signal in which the frequency representing the tips of the horizontal synchronizing pulses of the composite video signal is equal to the carrier frequency, an automatic frequency control circuit constructed to maintain the frequency of the carrier signal at a given frequency, said automatic frequency control circuit comprising a single cavity resonator tuned to a frequency which is substantially midway between the frequency of the carrier signal and the frequency representative of the front and back porches of the composite video signal when the frequency of the carrier signal is at said given frequency, means for detecting the output signal of the said tuned cavity, other means to derive a series of pulses from the horizontal synchronizing pulses of said composite video signal, and gating means connected to said detecting means and said other means and responsive to the simultaneous application thereto of the output signal from said detecting means and the output pulses of said other means to produce an output signal indicative of the deviation of the carrier signal frequency from said given frequency.

6. In a system comprising means for generating a carrier signal frequency modulated by a composite video signal having horizontal synchronizing pulses and front and back porches to produce a unipolar signal in which the frequency of the portions representing the tips of the horizontal synchronizing pulses of the composite video signal is equal to the carrier frequency, an automatic frequency control circuit constructed and arranged to maintain the frequency of the carrier signal at a given frequency, said automatic frequency control circuit comprising a single cavity resonator tuned to a frequency which is substantially midway between the frequency corresponding to the tips of the horizontal synchronizing pulses of the composite video signal and the frequency representative of the front and back porches of the composite video signal when the frequency of the carrier signal is at said given frequency, first means for deriving a first series of pulses in response to the difference in amplitudes of the portions of the tuned cavity output signal derived from the parts of the modulated signal representing the horizontal synchronizing pulses and the parts of modulated signal representing the front and back porches of the composite video signal, second means for deriving a second series of pulses from the horizontal synchronizing pulses of the composite video signal, said first means and said second means being further constructed so that each of the pulses of said first series of pulses coincides with a pulse of said second series of pulses, gating means connected to said first and second means and responsive to the simultaneous application thereto of a pulse from said first series of pulses and a pulse from said second series of pulses to produce an output signal indicative of deviation of the carrier signal frequency from said given frequency, and means connected to said gating means and responsive to the output from said gating means to modify the frequency of said carrier signal towards said given frequency.

7. In a system comprising means for generating a carrier wave frequency modulated by a composite video signal to produce a unipolar signal in which the frequency representing the tips of the horizontal synchronizing pulses of the composite video signal is equal to the carrier frequency, an automatic frequency control circuit constructed and arranged to maintain the frequency of the carrier wave at a given frequency, said automatic frequency control circuit comprising a single cavity resonator tuned to a frequency which is substantially midway between the frequency corresponding to the tips of the horizontal synchronizing pulses of the composite video signal and the frequency representative of the front and back porches of the composite video signal when the frequency of the carrier wave is at said given frequency, first detecting means for detecting the output of said cavity resonator, first differentiating means for differentiating the output of said first detecting means, second means for separating the synchronizing pulse of said composite video signal, second differentiating means constructed and arranged to differentiate the output of said second means, clipping means constructed and arranged to produce a unilateral output from the output of said second differentiating means, gating means connected to said first differentiating means and said clipping means and responsive to the simultaneous application thereto of the unilateral output from said clipping means and the output from said first differentiating means to produce an output signal indicative of deviation of the carrier wave frequency from said given frequency, and means connected to said gating means and responsive to the output from said gating means to modify the frequency of said carrier wave towards said given frequency.

References Cited in the file of this patent

UNITED STATES PATENTS

| | | |
|---|---|---|
| 2,203,634 | Richards | June 4, 1940 |
| 2,404,852 | Koch | July 30, 1946 |
| 2,501,368 | White | Mar. 21, 1950 |
| 2,594,380 | Barton et al. | Apr. 29, 1952 |
| 2,596,227 | Fernsler | May 13, 1952 |
| 2,714,132 | Fredenall | July 26, 1955 |
| 2,722,607 | Rubin | Nov. 1, 1955 |